United States Patent [19]
Hanes

[11] Patent Number: 6,040,382
[45] Date of Patent: Mar. 21, 2000

[54] POLYMER BLEND CLARITY

[75] Inventor: Mark D. Hanes, Bartlesville, Okla.

[73] Assignee: Phillips Petroleum Company, Bartlesville, Okla.

[21] Appl. No.: 08/192,334

[22] Filed: Feb. 4, 1994

[51] Int. Cl.$^7$ .................................................. C08L 9/00
[52] U.S. Cl. ........................ 525/98; 525/207; 525/241
[58] Field of Search ........................... 525/98, 93, 241, 525/207

[56] References Cited

U.S. PATENT DOCUMENTS

| | | | |
|---|---|---|---|
| 3,689,596 | 9/1972 | Narayana et al. | |
| 4,073,831 | 2/1978 | Tabana | 525/98 |
| 4,136,137 | 1/1979 | Hsieh et al. | 260/880 B |
| 4,178,275 | 12/1979 | Hsieh et al. | 260/33.6 A |
| 4,239,806 | 12/1980 | Hsieh et al. | 428/462 |
| 4,403,074 | 9/1983 | Moczygemba | 525/386 |
| 4,427,837 | 1/1984 | Tung et al. | 525/314 |
| 4,444,952 | 4/1984 | Feinberg | 525/93 |
| 4,678,833 | 7/1987 | McCreedy et al. | 525/66 |
| 4,898,912 | 2/1990 | Siol et al. | 525/199 |
| 5,053,276 | 10/1991 | Siol | 428/394 |
| 5,079,268 | 1/1992 | Nelissen et al. | 521/81 |
| 5,134,201 | 7/1992 | Billovits et al. | 525/423 |

FOREIGN PATENT DOCUMENTS

| | | |
|---|---|---|
| 0157642 | 12/1980 | Japan . |
| 0161836 | 12/1980 | Japan . |
| 0025349 | 2/1982 | Japan . |
| 0195139 | 11/1982 | Japan . |
| 0141233 | 8/1983 | Japan . |
| 0018747 | 1/1984 | Japan . |

OTHER PUBLICATIONS

AMOCO Technical Bulletin R–27a "AMOCO Resin 18 Properties and Applications", (date unavailable).
ARCO Chemical Company Technical Bulletin, "Dylark® Engineering Resins", Atlantic Richfield Company, 1986.
ARCO Chemical Company Technical Bulletin "Dylark® Engineering Resins Transparent Grades Technical Data", Atlantic Richfield Company, 1987.
Resin 18 Bulletin R–100, Sidell Resin Company, Columbia, MO.

*Primary Examiner*—Jeffrey C. Mullis
*Attorney, Agent, or Firm*—Richmond, Hitchcock, Fish & Dollar

[57] ABSTRACT

Optical clarity is improved in blends of two transparent immiscible polymers by addition of a third polymer which is selectively miscible with one of the two original immiscible polymers. The ratio of amounts of the third polymer and the one original polymer with which it is miscible is adjusted to achieve a resultant refractive index close to the refractive index of the other of the two original immiscible polymers. Alternatively, if particular amounts of the third polymer and the original polymer with which it is miscible are desired, then the other of the two immiscible polymers is chosen to be one having a refractive index close to the resultant refractive index of the two miscible polymers. One particular blend system in which optical clarity is improved by use of the methods of this invention is a blend comprising: (a) a resinous monovinyl aromatic-conjugated diene copolymer; (b) a styrene-maleic anhydride copolymer; and (c) poly(alpha-methylstyrene).

15 Claims, No Drawings

POLYMER BLEND CLARITY

FIELD OF THE INVENTION

This invention relates to a method for improving clarity of polymer blends and to a ternary blend system exemplifying the invention method.

BACKGROUND

Generally mixtures of transparent miscible polymers provide stable blends possessing optical clarity and a useful balance of mechanical properties depending upon properties of the individual blend components. By contrast, when two transparent immiscible polymers are blended, the mixture is generally hazy and exhibits light transmission properties which are less desirable than those of the individual components unless the refractive indices of the two transparent immiscible polymers are very nearly equal, i.e., differ by less than about 0.005.

There is a long standing need for ways of blending immiscible polymers with dissimilar refractive indices to obtain polymer blends with good optical properties, including low haze. Attempts to satisfy the need for transparent blends have concentrated on the selection or development of a second polymer with a refractive index to match the refractive index of the first polymer in the blend. This method has been quite restrictive to the development of transparent polymer blends.

SUMMARY OF THE INVENTION

It is an object of this invention to provide a method for producing low haze blends of immiscible transparent polymers which have dissimilar refractive indices.

A further object is to provide low haze blends of immiscible transparent polymers which have dissimilar refractive indices.

In one embodiment of this invention, a method is provided to decrease haze of blends of two immiscible transparent polymers by addition of a third polymer which is selectively miscible with one of the two original immiscible polymers. The ratio of amounts of the third polymer and the one original polymer with which it is miscible is adjusted to achieve a resultant refractive index close to the refractive index of the other of the two original immiscible polymers.

In another embodiment of this invention there are provided low haze blends of immiscible transparent polymers which have been produced according to the methods of this invention.

In yet another embodiment of this invention, the optical clarity of a blend of (a) a resinous polymodal monovinyl aromatic-conjugated diene block copolymer and (b) a styrene-maleic anhydride copolymer is improved by blending therewith poly(alpha-methylstyrene).

In a further embodiment of this invention, a blend comprises:

(a) a resinous polymodal monovinyl aromatic-conjugated diene block copolymer;

(b) a styrene-maleic anhydride copolymer; and (c) poly(alpha-methylstyrene).

DETAILED DESCRIPTION OF THE PREFERRED EMBODIMENTS

It has been discovered that, surprisingly, significantly improved clarity can be achieved in blends of two immiscible transparent polymers which have dissimilar refractive indices by addition of a third polymer which is selectively miscible with one of the two immiscible transparent polymers. The third polymer has a refractive index such that the refractive index of the third polymer and the refractive index of the polymer with which it is miscible will bracket the refractive index of the polymer which is immiscible with each of the other polymers. For example, if immiscible polymers A and B have refractive indices of 1.57 and 1.58, respectively, then a third polymer C which is miscible with polymer A must have a refractive index greater than 1.58 to be useful in practicing the invention in this example. A third polymer C which is miscible with polymer B must have a refractive index of less than 1.57 to be useful in practicing the invention in this example.

The closer the resultant refractive index of the two miscible polymers is to the refractive index of the bracketed immiscible polymer, the less haze can be achieved in the blend.

This invention can be useful in any of several situations. If it is known which two immiscible polymers are desired in a blend, the invention can give refractive index parameters for choice of a third polymer to use and predictive amounts for successful reduction of haze in articles made from blends of the immiscible polymers. If one polymer is chosen as a necessary component in a blend and it is known that other likely second polymer choices for the blend are immiscible with the first polymer, and there is available an additive third polymer known to be miscible with the first polymer, then the invention can be used to select the refractive index parameters within which the second blend polymer must fall and predictive amounts for minimization of haze of articles made from the blend. If it is known which three polymers are to be used in a ternary blend and the refractive indices of two of the polymers which are miscible with each other bracket the refractive index of the immiscible third polymer, then the invention can be used to predict relative amounts of the polymers needed to reduce haze of articles made from the blend.

The resultant refractive index of a miscible blend of polymers A and C can be calculated by using the classical Mossotti-Clausius equation for additivity by volume. This equation, expressed as a refractive index averaging rule, can be written:

$$\eta^2 = \frac{[\eta_A^2 \cdot \eta_C^2 + 2 \cdot \phi_A \cdot \eta_A^2 + (2 - 2 \cdot \phi_A) \cdot \eta_C^2]}{[2 + (1 - \phi_A) \cdot \eta_A^2 + \phi_A \cdot \eta_C^2]} \quad (I)$$

wherein $\eta$=resultant refractive index of homogeneous mixture of components A and C $\eta_A$=refractive index of component A $\eta_C$=refractive index of component C $\phi_A$=volume fraction of component A $\phi_C$=volume fraction of component C and where $\phi_A + \phi_C = 1$ Equation I can be used if it is already known what first polymer A and miscible additive third polymer C is desired in the blend at certain volume levels to obtain certain blend properties and/or for safety, economic or engineering reasons. The resultant refractive index is calculated, then an acceptable immiscible polymer component B with a refractive index substantially equal to the resultant refractive index of the A and C polymer blend can be chosen. In this manner there can be made a three component A, B and C blend with haze which is less than the haze of the two-component blends of polymers A and B or of polymers B and C.

The amount of the immiscible polymer B added to the two miscible polymers A and C in the blend is not critical if the refractive index of the immiscible polymer B is the same as or close to the resultant refractive index of the two miscible polymers. As the difference between the refractive index of the immiscible polymer B and the resultant refractive index of polymers A and C approaches 0, the haze of articles made from the blend is minimized. When the difference is between 0 and about 0.005, and the proportionate amounts of polymers in the blend is optimized, optical clarity associated with less than about 20% haze can be achieved. Most preferred is a difference value between 0 and 0.005.

In a system which meets these requirements, the resultant refractive index of one of the two immiscible polymers and the third polymer which is added to improve optical clarity of the blend is calculated and the other of the two immiscible polymers is chosen to be one with a refractive index as nearly equal as possible to the calculated resultant refractive index. However, if immiscible polymers A and B with certain refractive indices have already been chosen, there can be chosen a third polymer C which is miscible with either polymer A or polymer B and which has a refractive index that, with the refractive index of whichever of polymer A or B it is miscible, brackets the refractive index of the other of polymer A or B with which it is immiscible. If A and C are miscible with each other, the ratio of amounts of blend components A and C can be adjusted to achieve a resultant refractive index equal or close to the refractive index of component B.

Equation I can be solved for the volume fraction needed of component A thusly $$\phi_A = \frac{(2 \cdot \eta^2 + \eta^2 \cdot \eta_A^2 - \eta_A^2 \cdot \eta_C^2 - 2 \cdot \eta_C^2)}{(\eta^2 \cdot \eta_A^2 - \eta^2 \cdot \eta_C^2 + 2 \cdot \eta_A^2 - 2 \cdot \eta_C^2)} \qquad (II)$$

where $\eta$=resultant refractive index of homogeneous mixture of components A and C $\eta_A$=refractive index of component A $\eta_C$=refractive index of component C $\phi_A$=volume fraction of component A $\phi_C$=volume fraction of component C and where $\phi_A + \phi_C = 1$ The resultant refractive index of the two-component blend of A and C is set equal to the refractive index of component B; then in accordance with Equation II the volume fraction of component A needed to minimize the haze of the blend can be calculated.

Since the resultant refractive index of the blend of polymers A and C will be intermediate to the refractive indices of component polymers A and C, Equation II is used when the immiscible polymer B to be in the blend has a refractive index which is intermediate to that of component polymer A and additive third polymer C. In this system, the amount of the immiscible polymer component B is not critical if the resultant refractive index of the two miscible polymers A and C is nearly equal or equal to the refractive index of the immiscible polymer B.

Similarly, if polymer C is miscible with polymer B, the ratio of amounts of blend components B and C can be adjusted to achieve a resultant refractive index equal or close to the refractive index of component A. Equation I can be solved for the volume fraction needed of component A thusly $$\phi_B = \frac{(2 \cdot \eta^2 + \eta^2 \cdot \eta_B^2 - \eta_B^2 \cdot \eta_C^2 - 2 \cdot \eta_C^2)}{(\eta^2 \cdot \eta_B^2 - \eta^2 \cdot \eta_C^2 + 2 \cdot \eta_B^2 - 2 \cdot \eta_C^2)} \qquad (III)$$

where $\eta$=resultant refractive index of homogeneous mixture of components B and C $\eta_B$=refractive index of component B $\eta_C$=refractive index of component C $\phi_B$=volume fraction of component B $\phi_C$=volume fraction of component C and where $\phi_B + \phi_C = 1$ The resultant refractive index of the two-component blend of B and C is set equal to the refractive index of component A; then in accordance with Equation III the volume fraction of component B needed to minimize the haze of the blend can be calculated.

The polymers of this invention can be any transparent or almost transparent thermoplastic polymers. The polymers may be any normally transparent homopolymers, or copolymers, including polymodal polymers, copolymers and terpolymers.

The blends of this invention can be prepared by any suitable means including solution blending or melt mixing. Individual components can be dry mixed in the form of a powder or pellets, or wet mixed in the form of a solution or slurry, with subsequent melt extrusion compounding, batch melt mixing, or solution blending.

The polymers of this invention and any other ingredients or additives may be mechanically blended together in the desired proportions with the aid of any suitable mixing device conveniently used for mixing rubbers or plastics, such as, for example, a differential roll mill, a Banbury mixer, or an extruder.

In these types of methods, the polymers and any other components and additives used can be in any form, such as, for example, fluff, powder, granulate, pellet, solution, slurry, liquid and/or emulsion. Any additive used can be combined with the polymers according to any method known in the art. Examples of incorporation methods for additives include, but are not limited to, dry mixing in the form of a powder, wet mixing in the form of a solution or slurry and melt mixing.

All three of the components can be blended prior to extrusion. Alternatively, any two of the components could be premixed, for example, in a pellet concentrate or let down with the third component in an extrusion or other melt blending process. Another means of combining the components could be metering each of the three components separately into an extruder. The blends could be melt mixed in any sequence or at once prior to compression molding, blow molding, injection molding or extrusion procedures.

Melt extrusion compounding can be carried out in any manner that results in an homogenous blend of the three components. The melt extrusion can be done in any suitable melt extrusion apparatus. Single screw and twin screw extruders are examples of generally suitable types of melt extruders.

Alternatively, the blends of this invention can be prepared by batch mixing of the components in any order with each component added separately or with any of the components pre-mixed by any of the methods stated above, then subsequently batch mixed.

In order to facilitate thorough mixing of the polymers and to develop the desired combination of physical properties, the mechanical blending is carried out at a sufficiently high temperature to soften the polymers so that they are thoroughly dispersed and intermingled with each other. Usually whichever polymer is characteristically the highest temperature softening material of the composition will govern the mixing temperature selected. Generally, temperatures in the range from about 10° C. above the melting point or about 60° C. above the glass transition temperature of the highest softening material to about 200° C. above the melting point or about 250° C. above the glass transition temperature of the highest softening component would be used. More preferably, for good results mixing will generally need to be done at temperatures from about 30° C. to about 100° C. above the melting point of the highest melting component if the highest melting component is crystalline or at temperatures from about 50° C. to about 150° C. above the glass transition temperature of the higher melting component if the higher melting component is amorphous. Mixing is continued until an essentially uniform blend is obtained.

The blends made according to the methods of this invention can be made into consumer articles, components for consumer articles and other products which are less hazy and have optical properties superior to the properties of articles made from similar two-component blends which were not blended in accordance with the methods of this invention.

A Preferred Embodiment

One system which provides a good demonstration of this invention method is a method for producing blends of monovinylaromatic-conjugated diene block copolymers (S—B) with styrene-maleic anhydride copolymers (SMA) from which can be made articles with low haze. These two copolymers are immiscible and when blended produce materials with high haze because of that immiscibility and the dissimilar refractive indices of the two components. The styrene-maleic anhydride copolymer has a refractive index greater than the refractive index of the monovinylaromatic-conjugated diene copolymer. To obtain a blend of these two components from which can be made articles with optical clarity, a third component which is selectively miscible with the monovinylaromatic-conjugated diene copolymer and which has a refractive index greater than the refractive index of the styrene-maleic anhydride copolymer is chosen. Poly (alpha-methylstyrene) (AMS) with a refractive index of 1.61 and miscibility with the monovinylaromatic-conjugated diene copolymer is a useful third component for this S—B/SMA blend system.

The Monovinyl Aromatc-Conjugated Diene Block Copolymers

The monovinyl aromatic-conjugated diene copolymers useful in the S—B/SMA blend system application of this invention are transparent resinous block copolymers usually derived from a monovinyl substituted aromatic compound and a conjugated diene. These include such block copolymers as the types AB, ABA, tapered AB and ABA and copolymers with varying degrees of coupling including branched or radial (star block) copolymers, where A represents a polymerized monovinyl aromatic compound and B represents a polymerized conjugated diene. Other polymodal resinous block copolymers with different sequences of A and B blocks are also contemplated as useful in the present invention.

The resinous A blocks could be polymerized styrene, alpha-metbylstyrene, 4-methylstyrene, 3-methylstyrene, 2-methylstyrene, 4-ethylstyrene, 3-ethylstyrene, 2-ethylstyrene, 4-tertbutylstyrene, 2,4-dimethylstyrene and condensed aromatics such as vinyl napthalene and mixtures thereof. The A blocks could be random or tapered monovinyl aromatic/conjugated diene copolymers. Presently preferred is styrene. The rubbery B block could be polybutadiene, polypentadiene, a random or tapered monovinyl aromatic/conjugated diene copolymer, polyisoprene, a random or tapered monovinyl aromatic-isoprene copolymer, or mixtures thereof. Presently preferred is butadiene and/or isoprene.

For most examples of this blend system, polymodal styrene-butadiene block copolymers having a Shore D hardness as measured by ASTM D2240-86 of about 50 or higher, more preferably from about 64 to about 80, are presently preferred. These copolymers have a major amount of polymerized monovinyl aromatic compound, have resinous properties, and contain from about 50 to about 95 weight percent polymerized monovinyl aromatic, more preferably from about 65 to about 90 weight percent, and most preferably from about 70 to about 85 weight percent polymerized monovinyl aromatic, based on total weight of the copolymer. The remainder of the block copolymer is polymerized conjugated diene. They are prepared so that at least a portion of the final product is of a coupled character, linear or branched or both linear and branched.

It is generally desired that the melt flow of the monovinyl aromatic-conjugated diene copolymer be in the range from about 7 g/10 min to about 15 g/10 min. Above about 50 g/10 min the physical properties are not suitable. Below about 2 g/10 min the melt flow is so low that processability is decreased, melt flow drop-off increases and good mixing is more difficult to achieve.

A single monovinyl aromatic-conjugated diene copolymer or mixtures of more than one monovinyl aromatic-conjugated diene copolymer are considered useful in this application of the invention.

Basic preparation of the useful monovinyl aromatic-conjugated diene block copolymers is disclosed in U.S. Pat. No. 2,975,160, the disclosure of which is hereby incorporated herein by reference.

The presently preferred polymodal block copolymers can be produced in accordance with U.S. Pat. Nos. 3,639,517 and 3,251,905, the disclosures of which are hereby incorporated herein by reference. More specifically, they can be prepared by sequential charge copolymerization in the presence of a randomizer using initiator to promote polymodality, such as for example, the methods described in U.S. Pat. Nos. 4,584,346, 4,091,053, 4,704,434 and 4,704,435, the disclosures of which are hereby incorporated herein by reference.

Presently preferred for this blend system are those monovinyl aromatic-conjugated diene copolymers having a refractive index in the range from about 1.520 to about 1.590, more preferably in the range from about 1.560 to about 1.580, and most preferably from about 1.565 to about 1.575. One such presently preferred styrene-butadiene copolymer is commercially available from Phillips Petroleum Company as K-Resin® polymer.

The Styrene-Maleic Anhydride Copolymer

Random copolymers of styrene and maleic anhydrides can be manufactured by processes adapted from the technology used in producing polystyrene. One example, in its simplest form is crystal clear styrene-maleic anhydride copolymers produced by the reaction of styrene monomer with minor proportions of maleic anhydride and having a degree of polymerization from about 150 to about 400. The maleic anhydride, randomly incorporated into the polystyrene backbone, increases glass transition and heat distortion temperatures, making the copolymer a desirable blend component.

The styrene monomers which can be copolymerized with the maleic anhydride are those which produce a styrene-maleic anhydride copolymer with a refractive index of less than 1.61 and greater than 1.57. These monomers can contain a minor amount of any other copolymerizable monovinyl aromatic compound other than styrene, such as alpha-methylstyrene or vinyltoluene. A minor amount of other monomers such as methyl acrylate, methyl methacrylate, acrylonitrile and the like can be copolymerized with the styrene.

The styrene-maleic anhydride copolymers presently preferred for this blend system are those which contain from about 50 to about 95 weight percent polymerized styrene, more preferably from about 70 to about 92 weight percent polymerized styrene, and most preferably from about 80 to about 90 weight percent polymerized styrene, based on total weight of the styrene-maleic anhydride copolymer, with the balance of the copolymer being the maleic anhydride component.

Presently preferred for this S—B/SMA blend system are styrene-maleic anhydride copolymers having a refractive index in the range from about 1.570 to about 1.590, more preferably from about 1.572 to about 1.585, and most preferably from about 1.575 to about 1.582.

Three examples of such styrene-maleic anhydride copolymers are commercially available from ARCO Chemical Company as DYLARK 132, 232 and 332 resins, having the following properties which can serve to further characterize useful styrene-maleic anhydride copolymers:

| Property | ASTM | Typical Values |
| --- | --- | --- |
| Specific Gravity, 23/23° C. | D-792 | 1.08–1.10 |
| Melt Flow, g/10 mm Condition "L" 1238 | D-1238 | 1.5–1.9 |
| Tensile Strength, MPa | D-638 | 48.3–49.6 |
| Flexural Strength MPa | D-790 | 98.6–117.2 |
| Flexural Modulus, MPa | D-790 | 3,447–3,654 |
| Izod impact, notched, J/M | D-256 | 11.0–16.0 |
| Rockwell Hardness, L Scale | D-785 | 106–108 |
| Water Absorption, % | D-570 | 0.10 |
| Vicat Softening Point, ° C. | D-1525 | 112–130 |
| Deflection Temperature under Load, ° C. @ 16.6 kg/cm², ⅛" bar | D-648 | 91–107 |
| Coefficient of Linear Thermal Expansion, cm/cm/° C. × 10⁻⁵ | D-696 | 6.3 |
| Refractive Index | D-542 | 1.581–1.586 |
| Haze, % (0.125") | D-1003 | <2.0 |
| Spectral Transmission % (0.125") | D-1003 | 88.0 |

The Poly(alpha-methylstyrene)

The poly(alpha-methylstyrene) employed herein can be any poly(alpha-methylstyrene) homopolymer having a ring and ball softening point of from about 85° C. (185° F.) to about 150° C. (302° F.) as determined by test method ASTM D 36 or E28 which is miscible with one of the two other blend components being considered and which has an appropriate refractive index.

Poly(alpha-methylstyrene) can be prepared by any known method. One such method is described in "Preparation Methods of Polymer Chemistry," by W. R. Sorenson and T. W. Campbell, Interscience Publishers, Inc., 1961, wherein alpha-methylstyrene is diluted with ethyl chloride and treated at about −130° C. with a 1 weight percent solution of anhydrous aluminum chloride in ethyl chloride.

Presently preferred for this S—B/SMA blend system are poly(alpha-methyl styrene) homopolymers having a refractive index of 1.61. Generally presently most preferred are linear homopolymers of alpha-methylstyrene. One such poly(alpha-methylstyrene) which is commercially available from Amoco Chemical Company under the tradename Resin 18-290, has the following properties which can serve to further characterize these polymers:

| Property | Typical Value |
| --- | --- |
| Softening Point, ring and ball, ° C. | 141 |
| Color, Gardner | 1 |
| Acid Number | nil |
| Saponification Number | nil |
| Ash, % | 0.001 |
| Cloud Point, ° C. | 122 |
| Specific Gravity, 16/16° C. | 1.075 |
| Glass Transition Temperature, ° C. | 49 |
| Refractive Index, 20° C. | 1.61 |
| Flash Point, ° C. | 246 |
| Viscosity, mm²/S (Gardner-Holdt) 60% in toluene | 2300–2700 (Z—Z₁) |

Other poly(alpha-methylstyrene) homopolymers having properties near or equal to those for Resin 18-290 are within the scope of this invention.

Additives

The blends of this S—B/SMA blend system may contain certain other additives to plasticize, improve impact or flexural strength, improve processability, extend, lubricate, prevent oxidation, flame retard, dye, tint, etc., the polymeric composition. Such additives are well known in the art and may be incorporated without departing from the scope of the invention. The amount of additives may vary according to the additive, and/or its form, and/or its concentration.

Proportional Amounts of Components in a S—B/SMA Blend System

To maximize optical clarity of articles made from immiscible blends of monovinyl aromatic-conjugated diene copolymer A and styrene-maleic anhydride copolymer B, amounts of the monovinylaromatic-conjugated diene copolymers and the chosen third component C, poly(alpha-methylstyrene), are chosen so as to achieve a resultant refractive index within 0.005 of the refractive index of the styrene-maleic anhydride copolymer B.

Workable relative amounts of the monovinyl aromatic-conjugated diene copolymer A and alpha-methylstyrene polymer C are calculated by inserting the refractive indices of the monovinyl aromatic-conjugated diene copolymer A and of the selected additive component C into the following equation, setting the resultant refractive index η equal to the refractive index of the styrene-maleic anhydride copolymer B.

$$\phi_A = \frac{(2 \cdot \eta^2 + \eta^2 \cdot \eta_A^2 - \eta_A^2 \cdot \eta_C^2 - 2 \cdot \eta_C^2)}{(\eta^2 \cdot \eta_A^2 - \eta^2 \cdot \eta_C^2 + 2 \cdot \eta_A^2 - 2 \cdot \eta_C^2)} \quad \text{(II)}$$

where

η=resultant refractive index of homogeneous mixture of components A and C (set equal to refractive index of component B)

$\eta_a$=refractive index of component A $\eta_C$=refractive index of component C $\phi_A$=volume fraction of component A $\phi_C$=volume fraction of component C and where $\phi_A + \phi_C = 1$ Since the poly(alpha-methylstyrene) polymer C has a refractive index greater than the refractive index of copolymer B, copolymer B has a refractive index greater than that of copolymer A, and since copolymer C is miscible with copolymer A, adding any amount of the poly (alphamethylstyrene) polymer C will make some improvement in the optical clarity of the S—B/SMA blend system. Of course there will be some minimal amount necessary for noticeable reduction of haze in articles made from the blend. Adding poly(alpha-methylstyrene) polymer C in a proper amount relative to the amount of copolymer A according to Equation II will result in significant improvement in optical clarity of articles made from the A and B blend.

Generally, good ternary blends of monovinylaromatic-conjugated diene copolymers, styrene-maleic anhydride copolymers and alpha-methylstyrene which can be made into articles with advantageous properties are produced using amounts of each of the components chosen from within wide ranges because such factors as the ratios of comonomers in each of the copolymers in the blend can greatly vary the useful amounts. Generally, from about 5 to about 90 weight percent, based on total weight of the blend, of each of the three polymers in the blend can be used.

Use of too much monovinyl aromatic-conjugated diene copolymer in the blend will result in the resultant refractive index of the miscible polymers being too low, thus increasing the haze of the ternary blend. Use of too little monovinyl aromatic-conjugated diene copolymer in the blend will result in the resultant refractive index of the miscible polymers being too high, thus increasing the haze of the ternary blend. Use of too much styrene-maleic anhydride copolymer in the blend will have no effect on the optical clarity, but will result in loss of economic advantage. Use of too little styrene-maleic anhydride copolymer in the blend will have no effect on the optical clarity since the refractive index rather than volume is the limiting factor of the styrene-maleic anhydride in this S—B/SMA blend system. Use of too much poly(alpha-methylstyrene) in the blend will result in the resultant refractive index of the miscible polymers being too high, thus increasing the haze of the ternary blend. Use of too little poly(alpha-methylstyrene) in the blend will result in the resultant refractive index of the miscible polymers being too low, thus increasing the haze of the ternary blend.

Preparation of the S—B/SMA Blend System

The S—B/SMA/AMS blend systems can be prepared as described above with all components combined prior to extrusion or a blend of any two of the blend polymers combined prior to extrusion with the third polymer added during extrusion or in a subsequent extrusion. The presently preferred method for the S—B/SMA/AMS blend systems comprises dry mixing the S—B and AMS polymers in pellet, powder or granulate form, extruding the blend with downstream addition of the SMA, stranding the extrudate, chopping the strands into pellets and final processing (such as injection molding or sheet extrusion).

There can be made from the resulting S—B/SMA/AMS resins articles with good transparency, less than 10 percent haze and which have good heat distortion properties, flexural strengths and hardness. Articles made from these blends can be used for packaging, transparent boxes, toy parts, demonstration devices such as models of telephones or working telephones, view ports, and other applications requiring low haze transparent materials with advantageous mechanical properties.

The following example will be used to describe this presently preferred embodiment of the invention and should be taken as illustrative and not restrictive.

EXAMPLE I

This example of the invention demonstrates the use of poly(alpha-methyl styrene) as an additive polymer to improve optical clarity of a blend of resinous styrene-butadiene and styrene-maleic anhydride copolymers. This example shows that when the ratio of amounts of styrene-butadiene copolymer and alpha-methylstyrene are calculated in accordance with the invention equations set forth above to obtain a resultant refractive index close to that of the styrene-maleic anhydride copolymer, the normally hazy blends of styrene-butadiene and styrene-maleic anhydride copolymers have surprisingly improved optical clarity.

The first copolymer A used in Runs 1–15 for this example was a resinous polymodal styrene-butadiene copolymer made from multiple initiator and monomer charges and an epoxidized vegetable oil coupling agent. Copolymer A contained 75 percent styrene and 25 percent butadiene, had a nominal melt flow of 8 g/10 min, and had a refractive index of 1.571 measured at 23° C. on a sodium D line at a constant temperature. The styrene-butadiene copolymer used in this example was KRO3 grade K-Resin® polymer commercially available from Phillips Petroleum Company.

The styrene-maleic anhydride copolymer B used in runs 2–5 was DYLARK 332 resin having an 86 percent styrene and 14 percent maleic anhydride composition and a refractive index of 1.581. The styrene-maleic anhydride copolymer used in runs 7–15 was DYLARK 232 resin having an 89 percent styrene and 11 percent maleic anhydride composition and a refractive index of 1.583. Both of the resins were commercially available in a transparent pellet form from ARCO Chemical Company.

Copolymers A and B are normally immiscible and when combined result in blends which are opaque or translucent.

Copolymer C was chosen as the additive copolymer to reduce the haze of blends of copolymers A and B. Copolymer C was a low molecular weight, linear homopolymer of poly(alpha-methyl styrene), commercially available in granular form from Amoco Chemical Company as Resin 18-290. The poly(alpha-methyl styrene) had a refractive index of 1.61 measured at 20° C. according to ASTM D1218-92.

Measured amounts of each of the three polymers were dry blended and gravity fed into a Werner & Pfleiderer ZSK-30 vented twin-screw extruder with a screw feeder. The temperature zone of the extruder closest to the feeder was set at 205° C. and the other four barrel temperature zones were set at 210° C. The blends were extruded with an open vent. The extrudate was stranded and chopped into pellets.

The extruded blend pellets were injection molded into tensile bar and disk shaped test specimens on a 55-ton Engel injection molder. Barrel temperatures on the injection molder were set at 405° F. in the first zone and 410° F. in all other zones. Mold temperature was 80° F.

The injection molded test specimens were tested for properties using the test methods and conditions set forth in Table 1.

TABLE 1

Test Methods Used for Determining Polymer Properties

| Property | ASTM Method |
|---|---|
| Flow rate, Condition 200/5.0, g/10 min | D 1238-88 |
| Tensile strength at yield and break, MPa | D 638-89 at 50 mm/min Type I test specimens |
| Tensile modulus, MPa | D 638-89 |
| Elongation, calculated from crosshead travel, % | D 638-91 at 50 mm/min |
| Flexural modulus, MPa | D 790-86 |
| Flexural strength, MPa | D 790-86 |
| Izod impact strength, notched and unnotched, J/m | D 256-88 |
| Gardner impact strength, cm-kg/mm | D 3029-90 |
| Dynatup instrumental impact, maximum load, lbs | D 3763-92 |
| Dynatup impact strength, total energy, in-lbs | D 3763-92 |
| Shore D hardness | D 2240-91 |
| Vicat softening point, °C. | D 1525-91 |
| Haze, % | D 1003-61 (1990) |
| Transmittance, % | D 1003-61 (1990) |

Blend runs were made using the ratios of amounts of polymers shown in the following Table 2.

TABLE 2

Composition of Invention and Comparison Runs

| | wt %[a] monovinyl aromatic-conjugated diene | wt %[a] styrene maleic-anhydride | wt %[a] poly (alpha-methyl-styrene) | wt ratio S-B:SMA | wt ratio S-B:αMS |
|---|---|---|---|---|---|
| Comparison Run 1 | 100 | 0 | 0 | 100:0 | 100:0 |
| Comparison Run 2 | 80 | 20 | 0 | 80:20 | 100:0 |
| Comparison Run 3 | 60 | 40 | 0 | 60:40 | 100:0 |
| Comparison Run 4 | 40 | 60 | 0 | 40:60 | 100:0 |
| Comparison Run 5 | 20 | 80 | 0 | 20:80 | 100:0 |
| Comparison Run 6 | 70 | 0 | 30 | 70:0 | 70:30 |
| Invention Run 7 | 52 | 25 | 23 | 68:32 | 69:31 |
| Invention Run 8 | 33 | 50 | 17 | 40:60 | 66:34 |
| Invention Run 9 | 19 | 75 | 6 | 20:80 | 76:24 |
| Invention Run 10 | 17 | 75 | 8 | 18:82 | 68:32 |
| Invention Run 11 | 56 | 25 | 19 | 69:31 | 75:25 |
| Invention Run 12 | 35 | 50 | 15 | 41:59 | 70:30 |
| Invention Run 13 | 37 | 50 | 13 | 43:57 | 74:26 |
| Invention Run 14 | 49 | 25 | 26 | 66:34 | 65:35 |
| Invention Run 15 | 16 | 75 | 9 | 18:82 | 64:36 |

[a]Wt % is based on total weight of the composition.

TABLE 3

Properties of Test Specimens Made from Polymers Blends

| | Source of Polymer Blend | | | | | | | |
|---|---|---|---|---|---|---|---|---|
| Property | Comparison Run 1 | Comparison Run 2 | Comparison Run 3 | Comparison Run 4 | Comparison Run 5 | Comparison Run 6 | Invention Run 7 | Invention Run 8 |
| Tensile modulus, ksi | 250 | 290 | 330 | 400 | 480 | 324 | 364 | 444 |
| Tensile yield, ksi | 3.18 | 365 | 4.41 | 6.09 | n.a. | 4.05 | 4.91 | n.a. |
| Tensile Break, ksi | 2.27 | 3.21 | 3.04 | 5.43 | 8.43 | 2.37 | 2.84 | 6.47 |
| Elongation, % | 161.8[a] | 148[a] | 62.4[a] | 15.2[a] | 2.21 | 1.23 | 1.82 | 1.67 |
| Flexural modulus, MPa | 212 | 215 | 257 | 325 | 386 | 250 | 282 | 345 |
| Flexural strength, MPa | 4.24 | 5.54 | 6.14 | 8.57 | 10.8 | 5.38 | 6.71 | 8.72 |
| Izod impact, unnotched, ft. lb/in | 22.8[b] | 27.8[b] | 10.0 | 3.74 | 2.80 | 2.70 | 2.58 | 2.63 |
| Gardner impact, cm-Kg/mm | 100 | 79.0 | 0.49 | 0.33 | 0.1 | | | |
| Dynatup impact, maximum load, lbs. | 100.1 | 121 | 39.4 | 26.6 | 26.7 | n.a.[c] | n.a. | n.a. |
| Dynatup impact, total energy, in-lbs. | 30.9 | 32.4 | 2.12 | 1.90 | 1.62 | n.a. | n.a. | n.a. |
| Shore D hardness | 66 | 71 | 76 | 78 | 83 | 70 | 75 | 80 |
| Vicat softening point, °C. | 85.3 | 89.5 | 97.0 | 107.0 | 128 | 77.5 | 89.7 | 100.9 |
| Haze, % | 1.34 | 45 | 50 | 38.5 | 19.9 | 2.32 | 23.1 | 12.9 |

[a]Calculated from crosshead travel.
[b]No break.
[c]n.a. = not analyzed

| | Source of Polymer Blend | | | | | | |
|---|---|---|---|---|---|---|---|
| Property | Invention Run 9 | Invention Run 10 | Invention Run 11 | Invention Run 12 | Invention Run 13 | Invention Run 14 | Invention Run 15 |
| Tensile modulus, ksi | 502 | 506 | 350 | 420 | 412 | 374 | 500 |
| Tensile yield, ksi | n.a | n.a. | 4.46 | n.a.[a] | n.a. | 4.73 | n.a. |

TABLE 3-continued

| | Properties of Test Specimens Made from Polymers Blends | | | | | | |
|---|---|---|---|---|---|---|---|
| Tensile Break, ksi | 8.23 | 8.48 | 3.75 | 6.50 | 5.81 | 3.70 | 7.26 |
| Elongation, % | 1.91 | 2.09 | 116[b] | 2.02 | 1.94 | 27.6[b] | 1.63 |
| Flexural modulus, ksi | 393 | 396 | 274 | 328 | 330 | 295 | 422 |
| Flexural strength, ksi | 11.3 | 11.3 | 6.26 | 8.63 | 8.72 | 6.87 | 11.1 |
| Izod impact, unnotched, ft lb/in. | 2.81 | 2.76 | 3.43 | 2.86 | 2.98 | 2.33 | 2.49 |
| Gardner impact, CmKg/mm | | | | | | | |
| Shore D hardness | 82 | 83 | 73 | 79 | 77 | 74 | 81 |
| Vicat softening point, ° C. | 112.0 | 109.5 | 86.1 | 97.5 | 100.6 | 84.9 | 120.8 |
| Haze, % | 8.36 | 7.9 | 29.5 | 18.0 | 18.5 | 22.3 | 5.88 |

[a]n.a. = not analyzed.
[b]Calculated from crosshead travel.

These results show that when poly(alpha-methylstyrene) is used as an additive to reduce haze in articles made from blends of monovinylaromatic-conjugated diene block copolymers and styrene-maleic anhydride copolymers, appropriate ranges of amounts useful for the practice of this invention are consistent with those calculated using Equation II to choose blends having ratios of amounts of monovinyl aromatic-conjugated diene copolymer and poly(alpha-methylstyrene) which produce resultant refractive indices close to that of the styrene-maleic anhydride copolymer. Use of amounts of components which, when calculated according to equation II of the method of this invention, result in a difference between the resultant refractive index of the miscible blend components and the refractive index of the immiscible component of 0.010 or greater can result in polymer blends from which articles with less than 25 percent haze can be made. Differences between the miscible component resultant refractive index and the immiscible component refractive index in the intermediate range from 0.005 to 0.010 can result in polymer blends from which articles with less than 15 percent haze can be made. Use of the amounts of components in the blend system which are calculated to result in differences between the resultant refractive index of the miscible blend components and the refractive index of the immiscible component being identical ±0.005 can result in blends which can be made into articles having 6 percent or less haze.

EXAMPLE II

A second set of runs was conducted in the same manner as the set of runs made in Example I with the exception that in place of the commercially available styrene-butadiene copolymer a developmental styrene-butadiene block copolymer and a styrene-maleic anhydride copolymer having a 86:14 styrene:maleic anhydride weight content were used. The styrene-butadiene block copolymer used in this example was about 70 weight percent styrene and about 30 weight percent butadiene, was polymodal with a broad molecular weight distribution prior to coupling and had a nominal flow rate of 8 g/10 min. The refractive index of the styrene-butadiene copolymer of this example was calculated to be 1.569 using reported values for butadiene of 1.518 and styrene of 1.591. This refraction index was less than that of the commercial styrene-butadiene copolymer used in Example I.

Ratios of amounts of the blend components and properties of test specimens prepared in the same manner as those in Example I are shown in Tables 4 and 5.

TABLE 4

Composition of Invention and Comparison Runs

| | wt %[a] monovinyl aromatic-conjugated diene[b] | wt %[a] styrene maleic-anhydride[c] | wt %[a] poly(alpha-methyl-styrene)[d] | wt ratio S-B:SMA | wt ratio S-B:αMS |
|---|---|---|---|---|---|
| Comparison Run 16 | 100 | 0 | 0 | 100:0 | 100:0 |
| Invention Run 17 | 13 | 76 | 11 | 15:85 | 54:46 |
| Invention Run 18 | 14 | 79 | 7 | 15:85 | 67:33 |
| Invention Run 19 | 14 | 81 | 5 | 15:85 | 74:26 |
| Invention Run 20 | 21 | 62 | 17 | 25:75 | 55:45 |
| Invention Run 21 | 22 | 66 | 12 | 25:75 | 67:33 |
| Invention Run 22 | 23 | 69 | 8 | 25:75 | 74:26 |
| Invention Run 23 | 27 | 51 | 22 | 35:65 | 55:45 |
| Invention Run 24 | 29 | 55 | 16 | 35:65 | 64:36 |
| Invention Run 25 | 31 | 58 | 11 | 35:65 | 74:26 |
| Invention Run 26 | 22 | 66 | 12 | 25:75 | 65:35 |
| Comparison Run 27 | 0 | 100 | 0 | 0:100 | — |

[a]Wt % is based on total weight of the composition.
[b]Monovinyl aromatic-conjugated diene was a 70:30 styrene: butadiene polymodal block copolymer with a refractive index of 1.569.
[c]Styrene-maleic anhydride was a 86:14 styrene: maleic anhydride copolymer which had a refractive index of 1.581.
[d]Poly(alpha-methylstyrene) was a homopolymer which had a refractive index of 1.61.

TABLE 5

Properties of Test Specimens Made from Polymer Blends

| Property | Polymer Blend Source | | | | | |
| --- | --- | --- | --- | --- | --- | --- |
| | Comparison Run 16 | Invention Run 17 | Invention Run 18 | Invention Run 19 | Invention Run 20 | Invention Run 21 |
| Flexural modulus, ksi | 157 | 422 | 409 | 406 | 391 | 383 |
| Flexural strength, ksi | 2.51 | 8.72 | 9.71 | 10.2 | 7.75 | 8.40 |
| Izod impact, unnotched) ft-lb/in | 13.7[a] | 2.03 | 1.98 | 2.08 | 2.41 | 2.72 |
| Gardner impact, ft-lb/in | | | | | | |
| Vicat softening point, °C. | 75.4 | 121.3 | 123.9 | 126.0 | 114.7 | 117.8 |
| Haze, % | 1.68 | 4.36 | 7.90 | 11.8 | 7.34 | 11.7 |

| Property | Source of Polymer Blend | | | | | |
| --- | --- | --- | --- | --- | --- | --- |
| | Invention Run 22 | Invention Run 23 | Invention Run 24 | Invention Run 25 | Invention Run 26 | Comparison Run 27 |
| Flexural modulus, ksi | 371 | 360 | 348 | 321 | 365 | 476 |
| Flexural strength, ksi | 9.19 | 7.34 | 8.46 | 8.27 | 8.96 | 10.7 |
| Izod impact, unnotched, ft-lb/in | 2.86 | 2.34 | 2.80 | 3.62 | 2.59 | 2.11 |
| Vicat softening point, °C. | 119.1 | 106.8 | 107.5 | 108.1 | 116.2 | 129.5 |
| Haze, % | 20.2 | 8.06 | 18.8 | 31.3 | 13.2 | 0.94 |

[a]no break occurred.

The results in Tables 4 and 5 show that blend components with refractive indices differing from the refractive indices of the blend components used for Example I can successfully be used in the invention by varying the blend ratios in accordance with this invention.

While the compositions, processes and articles of manufacture of this invention have been described in detail for the purpose of illustration, the inventive compositions, processes and articles are not to be construed as limited thereby. This patent is intended to cover all changes and modifications within the spirit and scope thereof.

That which is claimed is:

1. A method for improving the optical clarity of a blend of (a) resinous polymodal monovinyl aromatic-conjugated diene block copolymer and (b) styrene-maleic anhydride copolymer, said method comprising combining therewith (c) poly(alpha-methylstyrene) in an amount sufficient to produce a blend composition which exhibits lower haze than said blend of (a) and (b).

wherein polymer (a) contains about 65–90 weight percent of at least one polymerized monovinyl aromatic compound and polymer (b) contains about 50–95 weight percent of ploymerized styrene.

2. A blend composition produced by the method of claim 1.

3. A method as recited in claim 1, wherein said resinous polymodal monovinyl aromatic-conjugated diene block copolymer is at least one styrene-butadiene block copolymer.

4. A blend composition produced by the method of claim 3.

5. A method in accordance with claim 3, wherein said styrene-butadiene block copolymer has a polymerized styrene content of about 70–85 weight percent, and said styrene-maleic anhydride copolymer has a polymerized styrene content of about 70–92 weight percent.

6. A blend composition produced by the method of claim 5.

7. A method in accordance with claim 5, wherein the weight ratio of said styrene-butadiene block copolymer to said styrene-maleic anhydride copolymer is in the range of about 15:85 to about 69:31, and the amount of polymer (c) which is combined with polymers (a) and (b) is such as to provide a weight ratio of said styrene-butadiene block copolymer to said poly(alpha-methylstyrene) in the range of about 54:46 to about 76:24.

8. A blend composition produced by the method of claim 7.

9. A method in accordance with claim 7 wherein the produced blend composition of polymers (a), (b) and (c) exhibits haze of less than about 20 percent, as determined by ASTM Method D 1003-61 (1990).

10. A blend composition produced by the method of claim 9.

11. A blend composition comprising:
(a) resinous polymodal monovinyl-aromatic-conjugated diene block copolymer containing about 65–90 of at least one polymerized monovinyl aromatic compound;
(b) styrene-maleic anhydride copolymer containing about 50–95 weight percent of polymerized styrene; and
(c) poly(alpha-methylstyrene),
wherein said blend composition exhibits lower haze than a blend comprising polymers (a) and (b) without polymer (c).

12. A blend composition in accordance with claim 11, wherein said resinous polymodal monovinyl aromatic-conjugated diene block copolymer is a styrene-butadiene block copolymer.

13. A blend composition in accordance with claim 12, wherein said styrene-butadiene block copolymer has a polymerized styrene content of about 70–85 weight percent, and said styrene-maleic anhydride copolymer has a polymerized styrene content of about 70–92 weight percent.

14. A blend composition in accordance with claim 13, wherein the weight ratio of said styrene-butadiene block copolymer to said styrene-maleic anhydride copolymer is in the range of about 15:85 to about 69:31, and the amount of polymer (c) which is combined with polymers (a) and (b) is such as to provide a weight ratio of said styrene-butadiene block copolymer to said pol(alpha-methylstyrene) in the range of about 54:46 to about 76:24.

15. A blend composition in accordance with claim 14, which exhibits haze of less than about 20 percent, as determined by ASTM Method D 1003-61 (1990).

\* \* \* \* \*